(12) United States Patent
Yamamoto et al.

(10) Patent No.: US 7,483,357 B2
(45) Date of Patent: Jan. 27, 2009

(54) OPTICAL PICKUP AND OPTICAL DISC APPARATUS

(75) Inventors: Kenji Yamamoto, Kanagawa (JP); Katsutoshi Sato, Tokyo (JP); Noriaki Nishi, Kanagawa (JP); Midori Kanaya, Tokyo (JP)

(73) Assignee: Sony Corporation, Tokyo (JP)

( * ) Notice: Subject to any disclaimer, the term of this patent is extended or adjusted under 35 U.S.C. 154(b) by 641 days.

(21) Appl. No.: 11/118,349

(22) Filed: May 2, 2005

(65) Prior Publication Data
US 2005/0265207 A1 Dec. 1, 2005

(30) Foreign Application Priority Data
May 14, 2004 (JP) ............... 2004-144837
Apr. 12, 2005 (JP) ............... 2005-114380

(51) Int. Cl.
G11B 7/135 (2006.01)
(52) U.S. Cl. .................. 369/112.17; 369/112.24
(58) Field of Classification Search ............ 369/112.17, 369/112.21, 112.04, 112.09, 121–122
See application file for complete search history.

(56) References Cited

U.S. PATENT DOCUMENTS

| | | | |
|---|---|---|---|
| 4,167,024 A * | 9/1979 | Hamisch | 358/128 |
| 4,642,701 A * | 2/1987 | Maeda et al. | 358/296 |
| 6,834,036 B1 * | 12/2004 | Shiono et al. | 369/112.03 |
| 7,133,332 B2 * | 11/2006 | Kimura | 369/44.32 |
| 7,173,898 B2 * | 2/2007 | Nishi et al. | 369/116 |
| 2003/0151996 A1 * | 8/2003 | Hendriks et al. | 369/53.2 |
| 2004/0120245 A1 * | 6/2004 | Arikawa et al. | 369/121 |
| 2004/0156301 A1 * | 8/2004 | Ikenaka | 369/112.17 |
| 2004/0170106 A1 * | 9/2004 | Komma | 369/112.1 |
| 2004/0233827 A1 * | 11/2004 | Yi et al. | 369/121 |
| 2005/0068881 A1 * | 3/2005 | Kimura et al. | 369/112.23 |
| 2005/0286392 A1 * | 12/2005 | Kamei | 369/121 |
| 2006/0256674 A1 * | 11/2006 | Ikenaka et al. | 369/44.37 |

FOREIGN PATENT DOCUMENTS

JP 10-199026 7/1998

OTHER PUBLICATIONS

U.S. Appl. No. 11/113,037, filed Apr. 25, 2005, Yamamoto et al.
U.S. Appl. No. 11/116,303, filed Apr. 28, 2005, Nishi et al.
U.S. Appl. No. 11/119,927, filed May 3, 2005, Sato et al.
U.S. Appl. No. 11/118,349, filed May 2, 2005, Yamamoto et al.

* cited by examiner

Primary Examiner—William J Klimowicz
Assistant Examiner—Chibuike K Nwakamma
(74) Attorney, Agent, or Firm—Oblon, Spivak, McClelland, Maier & Neustadt, P.C.

(57) ABSTRACT

An optical pickup housing an optical system including a collimator lens for converting laser light incident on the collimator lens into an approximately parallel light beam, and an objective lens for receiving the laser light converted into the approximately parallel light beam and focusing the laser light onto a recording medium, the optical pickup having a light source configured to emit a plurality of laser beams of different wavelengths; a magnification conversion element arranged between the collimator lens and the objective lens; a bypass optical path configured to bypass the magnification conversion element; and optical path selection unit configured to select, according to a wavelength of each of the plurality of laser beams, whether each of the plurality of laser beams is to pass through an optical path passing through the magnification conversion element or through the bypass optical path.

13 Claims, 8 Drawing Sheets

OPTICAL PICKUP AND OPTICAL DISC APPARATUS

BACKGROUND OF THE INVENTION

1. Field of the Invention

The present invention relates to an optical pickup and an optical disc apparatus which are capable of recording and reproducing a plurality of types of optical discs such as CDs (Compact Discs), DVDs (Digital Versatile Discs) and BDs (Blu-ray Discs) and, more particularly, to optimum optical magnification of laser light for the kind of disc to be recorded or reproduced.

2. Description of Related Art

In recent years, CDs (Compact Discs: hereinafter "CD(s)") and DVDs (Digital Versatile Discs: hereinafter "DVD (s)") for recording and reproduction of image information and music information have become popular, and CD/DVD compatible pickups have been developed (refer to Patent Document 1 (Japanese Patent Laid-Open Publication No. Hei10-199026, Pages 3 and 4, FIG. 1)). In order to meet demands for further increases in recording density and storage capacity, a high-density optical disc such as a BD (Blu-ray Disc: hereinafter "BD") using a blue-wavelength laser light of wavelength 407 nm have been introduced.

In such circumstances, optical disc apparatuses for recording and reproducing three types of discs such as CDs, DVDs and BDs have been developed and manufactured. Such an optical disc apparatus uses laser light beams of wavelengths 780 nm, 650 nm and 407 nm for recording and reproducing CDs, DVDs and BDs. In this structure, if an optical system which includes an objective lens for focusing laser light onto a disc and receiving light reflected from the disc can be shared by the three types of laser light beams, the optical system can be made simple, whereby a further decrease in size and weight of optical pickups can be realized.

SUMMARY OF THE INVENTION

A laser diode (LD) for the above-mentioned three wavelengths emits laser light beams of different wavelengths, i.e., 407 nm, 650 nm and 780 nm, and the laser light beams differ from one another in divergence (radiation) angle and emission power, and the optimum states of intensity distribution of the laser light beams which enter the objective lens also differ from one another. Accordingly, the optimum optical magnification at which each of the laser light beams is focused onto a respective one of the discs (the optical magnification of a forward path) differs among the discs; for example, approximately 10-12 for BD, approximately 5 for DVD, and approximately 4 for CD. In the following description, the term "optical magnification" is used to mean the optical magnification of the forward path.

Figure 9:
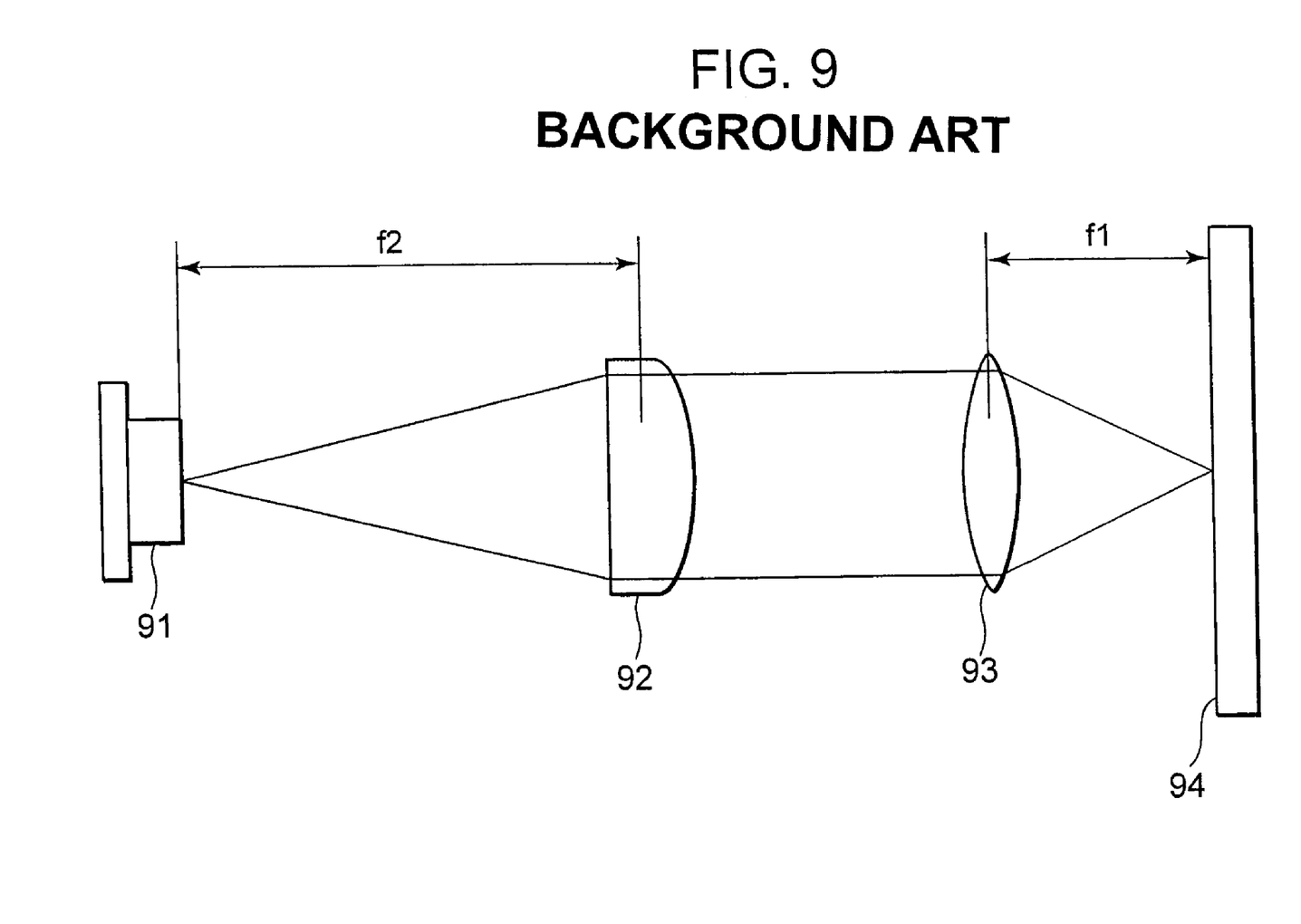
FIG. 9 is a block diagram showing the structure of a optical system of the related art which determines an optical magnification at which a laser light is to be focused.

FIG. 9 is a block diagram showing an optical system which determines the optical magnification at which laser light is focused onto a disc. A laser light emitted from a laser diode 91 is converted into an approximately parallel light beam by a collimator lens 92, and the approximately parallel light beam is focused onto a disc 94 by an objective lens 93. The optical magnification, β, of the optical system is expressed by the following formula:

$$\beta = f2/f1 \qquad (1)$$

where f1 denotes the focal length of the objective lens 93 and f2 denotes the focal length of the collimator lens 92.

Thus, if the optical magnification of the forward path from the laser diode 91 to a signal surface of the disc 94 (the ratio of the focal length of the collimator lens 92 to the focal length of the objective lens 93) is optimized for one wavelength, the optical magnification has no degree of freedom with respect to other wavelengths and deviates from optimum values.

To address this issue, a method may be adopted of making the focal length of either the collimator lens 92 or the objective lens 93 variable. There are two methods to date: (1) in the case where the laser diode LD has different emission points, if the emission points of the laser diode LD are independent from one another, coupling lenses for magnification adjustment are respectively arranged between the laser diodes LD and the collimator lens 92 so as to adjust a composite focal length defined by each of the coupling lenses and the collimator lens; and (2) in the case where different objective lens units are arranged for the respective wavelengths as an objective lens, the optical path is branched in front of the objective lens units according to each of the wavelengths and one of the plurality of objective lens units is used to adjust the focal length of the objective lens.

However, in the method (1), in the case where the emission points of the laser diode LD are arranged at approximately the same position, since the optical path between the laser diode LD and the collimator lens is a shared optical path, coupling lenses corresponding to the respective wavelengths are impossible to arrange between the laser diode LD and the collimator lens. In the method (2), it is impossible to integrate the objective lens units into one unit so as to promote a reduction in size and cost.

The present invention has been conceived in view of the above-mentioned issues, and an optical pickup is provided for setting optimum optical magnifications for different wavelengths without an increase in size and cost by means of an optical system made of a collimator lens and an objective lens so as to permit laser light beams of multiple wavelengths to pass through in a sharing manner, as well as an optical disc apparatus using the optical pickup.

Therefore, according to a preferred embodiment of the present invention, there is provided an optical pickup which houses an optical system having a collimator lens which converts a laser light incident on the collimator lens into an approximately parallel light beam and an objective lens which receives the laser light converted into the approximately parallel light beam and focuses the laser light onto a recording medium, the optical pickup including a magnification conversion element which is arranged between the collimator lens and the objective lens, a bypass optical path which bypasses the magnification conversion element, and optical path selection unit for selecting, according to the wavelength of each of the plurality of laser light beams, whether each of the plurality of laser light beams is to pass through an optical path passing through the magnification conversion element or through the bypass optical path.

According to another preferred embodiment of the present invention, there is provided an optical disc apparatus which focuses a laser light onto an optical disc by an optical pickup and receives light reflected from the optical disc by the optical pickup, thereby performing recording and reproduction of data on and from the optical disc, the optical pickup including a collimator lens which converts a laser light incident on the said light source into an approximately parallel light beam, an objective lens which focuses the laser light converted into the approximately parallel light beam onto a recording medium, a magnification conversion element which is arranged between the collimator lens and the objective lens, a bypass optical path which bypasses the magnification conversion element, and optical path selection unit for selecting, according to the wavelength of each of the plurality of laser light beams, whether each of the plurality of laser light beams is to pass through an optical path passing through the magnification conversion element or through the bypass optical path.

According to the above-mentioned preferred embodiments of the present invention, in the case where a plurality of types of recording media such as BD, DVD and CD are respectively recorded and reproduced by a plurality of laser light beams of different wavelengths through an optical system made of a collimator lens and an objective lens shared by the plurality of laser light beams, whether each of the plurality of laser light beams is to pass through an optical path passing through a magnification conversion element provided between the collimator lens and the objective lens or through a bypass optical path which bypasses the magnification conversion element can be selected according to the wavelength of each of the laser light beams so that optimum optical magnifications for the respective wavelengths can be set without an increase in size and cost by means of the optical system made of the collimator lens and the objective lens which permit the laser light beams of multiple wavelengths to pass through in a sharing manner.

According to the preferred embodiments of the present invention, in the case where a plurality of types of recording media such as BD, DVD and CD are respectively recorded and reproduced by a plurality of laser light beams of different wavelengths through an optical system made of a collimator lens and an objective lens shared by the plurality of laser light beams, whether each of the plurality of laser light beams is to pass through an optical path passing through a magnification conversion element provided between the collimator lens and the objective lens or through a bypass optical path which bypasses the magnification conversion element can be selected according to the wavelength of each of the laser light beams, whereby optimum optical magnifications for the respective wavelengths can be set by a simple structure using the optical system made of the collimator lens and the objective lens which permit the laser light beams of different wavelengths to pass through in a sharing manner.

BRIEF DESCRIPTION OF THE DRAWINGS

The above and other objects, features and advantages of a preferred embodiment of the present invention will become more apparent from the following description of the presently preferred exemplary embodiments of the invention taken in conjunction with the accompanying drawings, in which.

DESCRIPTION OF THE PREFERRED EMBODIMENTS

Preferred embodiments of the present invention will be described below in detail. In the following preferred embodiments, whether each of laser light beams of different wavelengths is to pass through a magnification conversion element provided in an optical path between a collimator lens and an objective lens or through a bypass optical path which bypasses the magnification conversion element can be selected according to the wavelength of each of the laser light beams so that optimum optical magnifications for the respective laser light beams can be set without an increase in size and cost by means of an optical system made of the collimator lens and the objective lens which permit the laser light beams of different wavelengths to pass through in a sharing manner.

Embodiment 1

Figure 1:
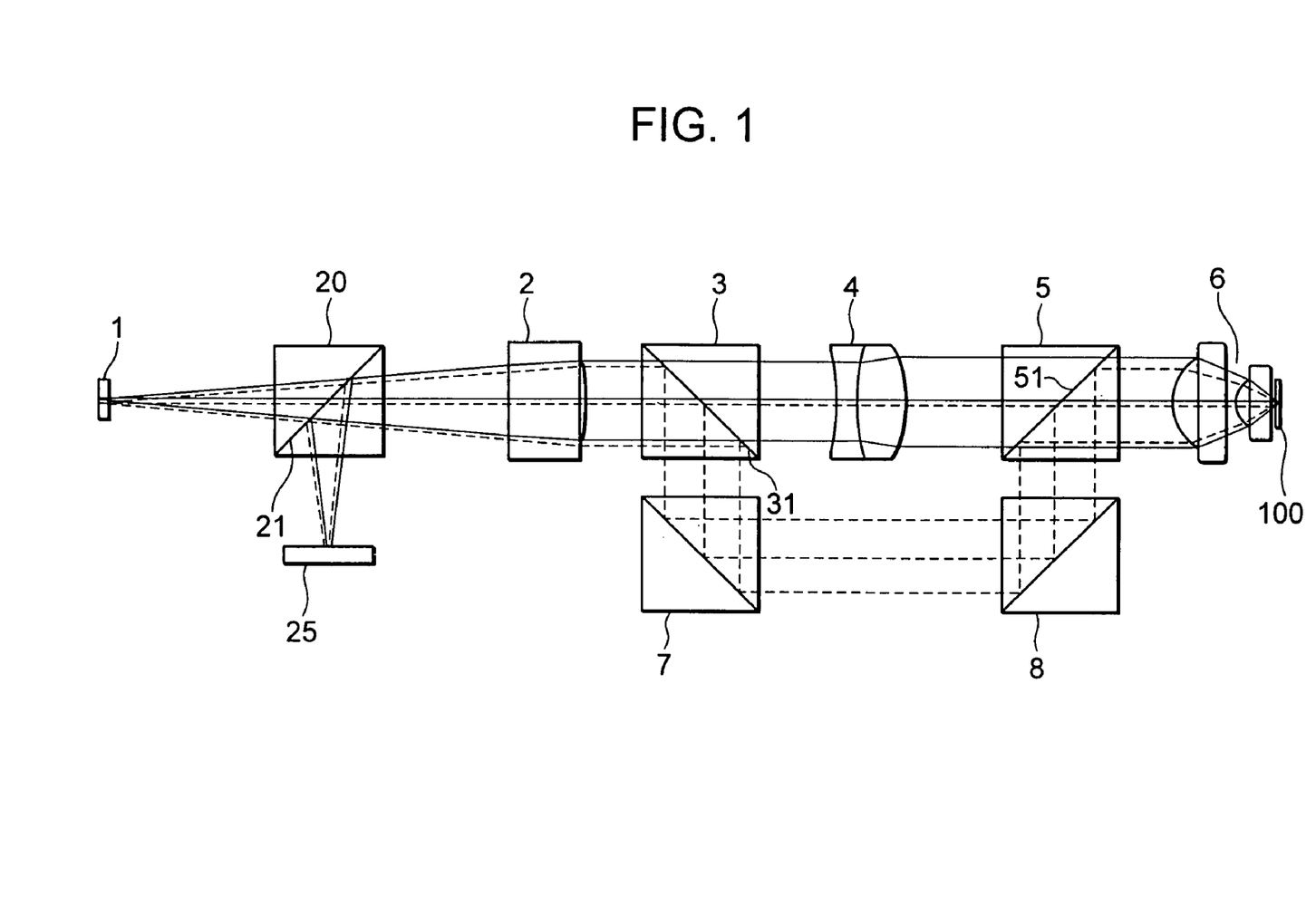
FIG. 1 is a block diagram showing the structure of an optical system housed in an optical pickup according to a first embodiment of the present invention.

FIG. 1 is a block diagram showing the structure of an optical system housed in an optical pickup according to a first embodiment of the present invention. The optical system of the optical pickup includes a three-wavelength laser diode (LD) 1 which emits laser light beams of three different wavelengths, a collimator lens 2 which converts three different wavelengths emitted from the three-wavelength laser diode 1 into approximately parallel light beams, respectively, a first beam splitter 3, a magnification conversion element 4, a second beam splitter 5, a three-wavelength objective lens 6, mirrors 7 and 8, a third beam splitter 20 which separates a laser beam reflected by an optical disc 100 from an optical path that goes from the three-wavelength laser diode 1 toward the optical disc 100, and a light detector 25 which receives the laser light separated by the third beam splitter 20. The mirrors 7 and 8 form a bypass optical path which allows laser light to bypass the magnification conversion element 4.

The operation of the first embodiment will be described below. First, if the optical disc 100 is a BD, a laser light of wavelength 407 nm for BD is emitted from the three-wavelength laser diode 1. The laser light is converted into an approximately parallel light beam by the collimator lens 2 after passing through the third beam splitter 20, and the approximately parallel light beam passes through the first beam splitter 3 and enters the magnification conversion element 4. The laser light whose beam diameter is magnified by the magnification conversion element 4 passes through the second beam splitter 5 and enters the three-wavelength objective lens 6, and is focused onto the optical disc 100 by the three-wavelength objective lens 6. At this time, light reflected from the optical disc 100 enters the three-wavelength objective lens 6 and is converted into an approximately parallel light beam, and the approximately parallel light beam passes through the second beam splitter 5. After the beam diameter of the light beam is reduced by the magnification conversion element 4, the light beam passes through the first beam splitter 3 and the collimator lens 2, and enters the third beam splitter 20. The light beam is changed by 90 degrees in optical path by being reflected by a film 21 provided in the third beam splitter 20, and enters a signal detector 25.

In this case, since the magnification conversion element 4 is provided in the optical path, the following formula is obtained:

$$\beta = K \cdot f2/f1 \qquad (2)$$

where f2 denotes the focal length of the three-wavelength collimator lens 2, f1 denotes the focal length of the three-wavelength objective lens 6, β denotes optical magnification, and K denotes the magnification of the magnification conversion element 4.

In this case, if the magnification K of the magnification conversion element 4 is larger than 1, the beam diameter of the laser light which enters the magnification conversion element 4 in the above-mentioned manner is increased to change a composite focal length defined by the magnification conversion element 4 and the three-wavelength objective lens 6, thereby reducing the composite focal length. Accordingly, from formula (2), the optical magnification β is increased by the action of the magnification conversion element 4, whereby the optical magnification β can be increased twelve fold, for example.

If the optical disc 100 is a DVD, laser light of wavelength 650 nm for DVD is emitted from the three-wavelength laser diode 1. The laser light is converted into an approximately parallel light beam by the collimator lens 2 after passing through the third beam splitter 20, and the approximately parallel light beam is changed by 90 degrees in optical path by being reflected by the film 31 of the first beam splitter 3, and enters the mirror 7. The light beam is changed by 90 degrees in optical path by the mirror 7 and enters the mirror 8, and is further changed by 90 degrees in optical path by the mirror 8 and enters the second beam splitter 5. The laser light which enters the second beam splitter 5 is changed by 90 degrees in optical path by a film 51 of the second beam splitter 5 and enters the three-wavelength objective lens 6, and is focused onto the optical disc 100 by the three-wavelength objective lens 6. Light reflected from the optical disc 100 at this time enters the three-wavelength objective lens 6 and is converted into an approximately parallel light beam, and the approximately parallel light beam enters the second beam splitter 5. The light beam is changed by 90 degrees in optical path by the film 51 and enters the mirror 8, and is changed by 90 degrees in optical path by the mirror 8 and enters the mirror 7. The light beam is further changed by 90 degrees in optical path by the mirror 7, enters the first beam splitter 3, is reflected by the film 31 and passes through the collimator 2. In addition, enters the first beam splitter 3, is reflected by the film 31 and changed by 90 degrees in optical path to then enter the signal detector 25.

Namely, if a laser light of wavelength 650 nm is emitted from the three-wavelength laser diode 1, the laser light (including light reflected from the optical disc 100) is made pass through the bypass optical path formed by the first beam splitter 3, the mirrors 7 and 8, and the second beam splitter 5 without passing through the magnification conversion element 4, so that the optical magnification β becomes:

$$\beta = f2/f1 \qquad (3)$$

Accordingly, if K>1, the optical magnification β becomes smaller than that expressed by formula (2) relating to the case where a laser light passes through the magnification conversion element 4, and can be made fivefold, for example.

Figure 2:
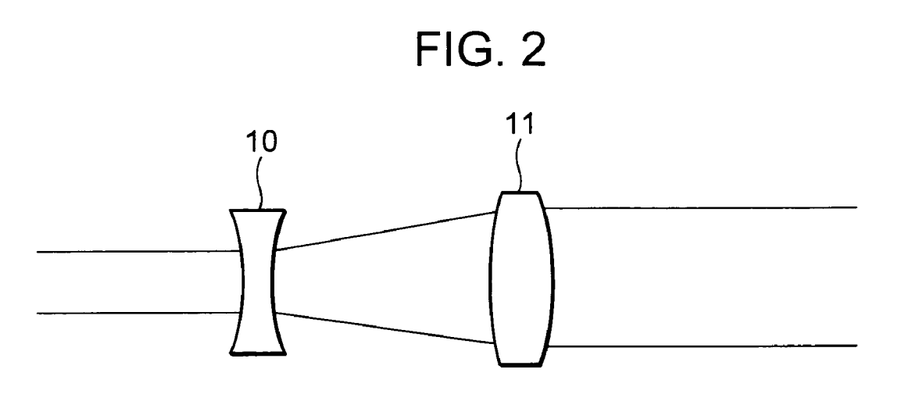
FIG. 2 is a view showing a detailed example of the structure of the magnification conversion element shown in FIG. 1.
Figure 3:
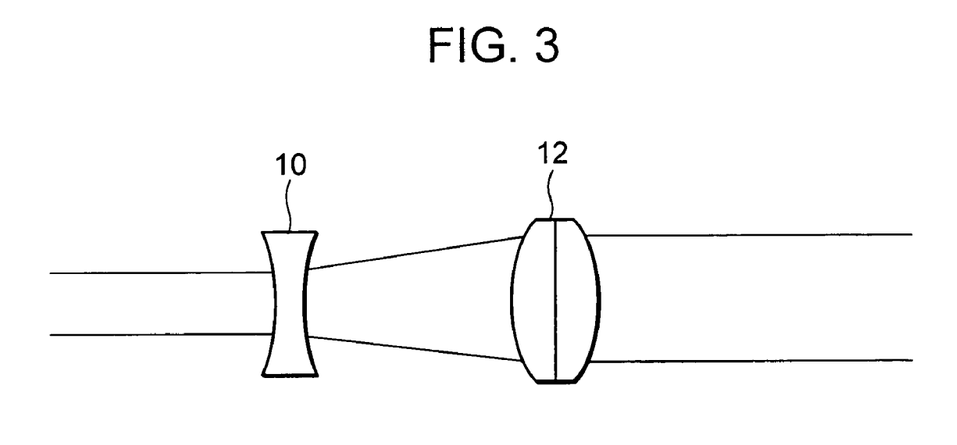
FIG. 3 is a view showing another detailed example of the structure of the magnification conversion element shown in FIG. 1.

In this structure, as the magnification conversion element 4, it is possible to use a one-group/two-element expander lens as shown in FIG. 1, a two-group/two-element expander lens (10, 11) as shown in FIG. 2, a two-group/three-element expander lens (10, 12) as shown in FIG. 3, or the like.

Although not shown, the films 31 and 51 of the first and second beam splitters 3 and 5 may also be designed so that when a laser light of wavelength 780 nm is emitted from the three-wavelength laser diode 1, the laser light (including light reflected from the optical disc 100) passes through the bypass optical path formed by the first beam splitter 3, the mirrors 7 and 8, and the second beam splitter 5. In this case, the optical magnification β is, for example, fivefold as expressed by formula (3), but optimum optical magnification for the recording and reproduction of CDs is approximately fourfold which is not very different from fivefold, so that degradation can be almost completely prevented from occurring in recording and reproduction characteristics.

According to this first embodiment, in the optical paths each having the three-wavelength collimator lens 2 and the three-wavelength objective lens 6 which are shared by laser light beams of three wavelengths for BD, DVD and CD, a laser light is made to pass through either the optical path passing through the magnification conversion element 4 or the bypass optical path bypassing the magnification conversion element 4, according to the wavelength of the laser light, whereby the optical magnification can be freely changed to optimum values for the types of discs to be recorded or reproduced.

In addition, if a one-group/two-element expander lens and a two-group/two-element expander lens are used as the magnification conversion element 4, it is also possible to obtain the advantage of correcting the optical system for chromatic aberration in the optical path passing through the magnification conversion element 4.

Embodiment 2

Figure 4:
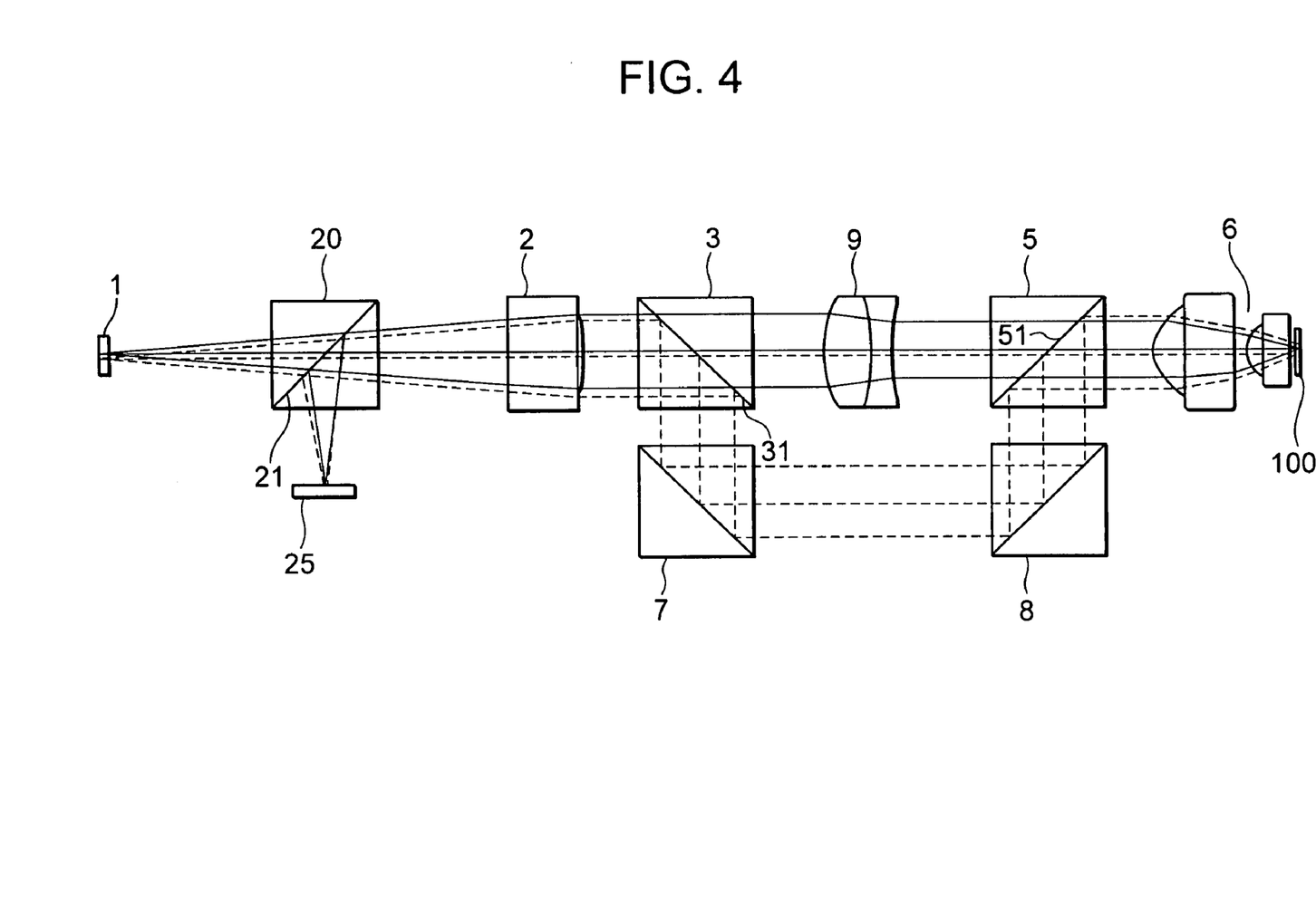
FIG. 4 is a block diagram showing the structure of an optical system housed in an optical pickup according to a second embodiment of the present invention.

FIG. 4 is a block diagram showing the structure of an optical system housed in an optical pickup according to a second embodiment of the present invention. In FIG. 4, the same reference numerals are used to denote the same sections as those used in the first embodiment, and the description of the same sections is omitted. The optical system of the optical pickup includes the three-wavelength laser diode (LD) 1, the three-wavelength collimator lens 2, the first beam splitter 3, a magnification conversion element 9, the second beam splitter 5, the three-wavelength objective lens 6, the mirrors 7 and 8, and a third beam splitter 20 which separates a laser beam reflected by the optical disc 100 from an optical path that goes toward the optical disc 100 upon being emitted by the three-wavelength laser diode, and a light detector 25 which receives the laser light separated by the third beam splitter 20 and reflected by the optical disc 100. The mirrors 7 and 8 form a bypass optical path which allows laser light to bypass the magnification conversion element 9.

The operation of the second embodiment will be described below. In the second embodiment, a magnification conversion element of K<1 is used as the magnification conversion element 9, and the films 31 and 51 of the first and second beam splitters 3 and 5 are designed so that when a laser light of wavelength 407 nm for BD is emitted, the laser light is made to pass through the bypass optical path formed by the first beam splitter 3, the mirrors 7 and 8, and the second beam splitter 5, whereas when a laser light of wavelength 650 nm for DVD is emitted, the laser light is made pass through an optical path formed by the first beam splitter 3, the magnification conversion element 9 and the second beam splitter 5.

In the second embodiment as well, the optical magnification β of the optical path bypassing the magnification conversion element 9 is expressed by formula (3), and the optical magnification β of the optical path passing through the magnification conversion element 9 is expressed by formula (2). Accordingly, if the optical magnification β of the optical path along which a laser light of wavelength 407 nm bypasses the magnification conversion element 9 is set to, for example, 12, the optical magnification K of the magnification conversion element 9 through which a laser light of wavelength 650 nm passes becomes smaller than 1, so that the optical magnification β becomes smaller than that expressed by formula (2) and can be made 5, for example. In this case as well, when a laser light of wavelength 780 nm for CD is emitted, the optical path passing through the magnification conversion element 9 is used for the same reason as the first embodiment.

According to the second embodiment, it is possible to obtain an advantage similar to that of the first embodiment by selecting either one of the optical paths by means of the first and second beam splitter 3 and 5 so that the bypass optical path which bypasses the magnification conversion element 9 is used during recording and reproduction of BDs, while the optical path which passes through the magnification conversion element 9 is used during recording and reproduction of DVDS.

Embodiment 3

Figure 5:
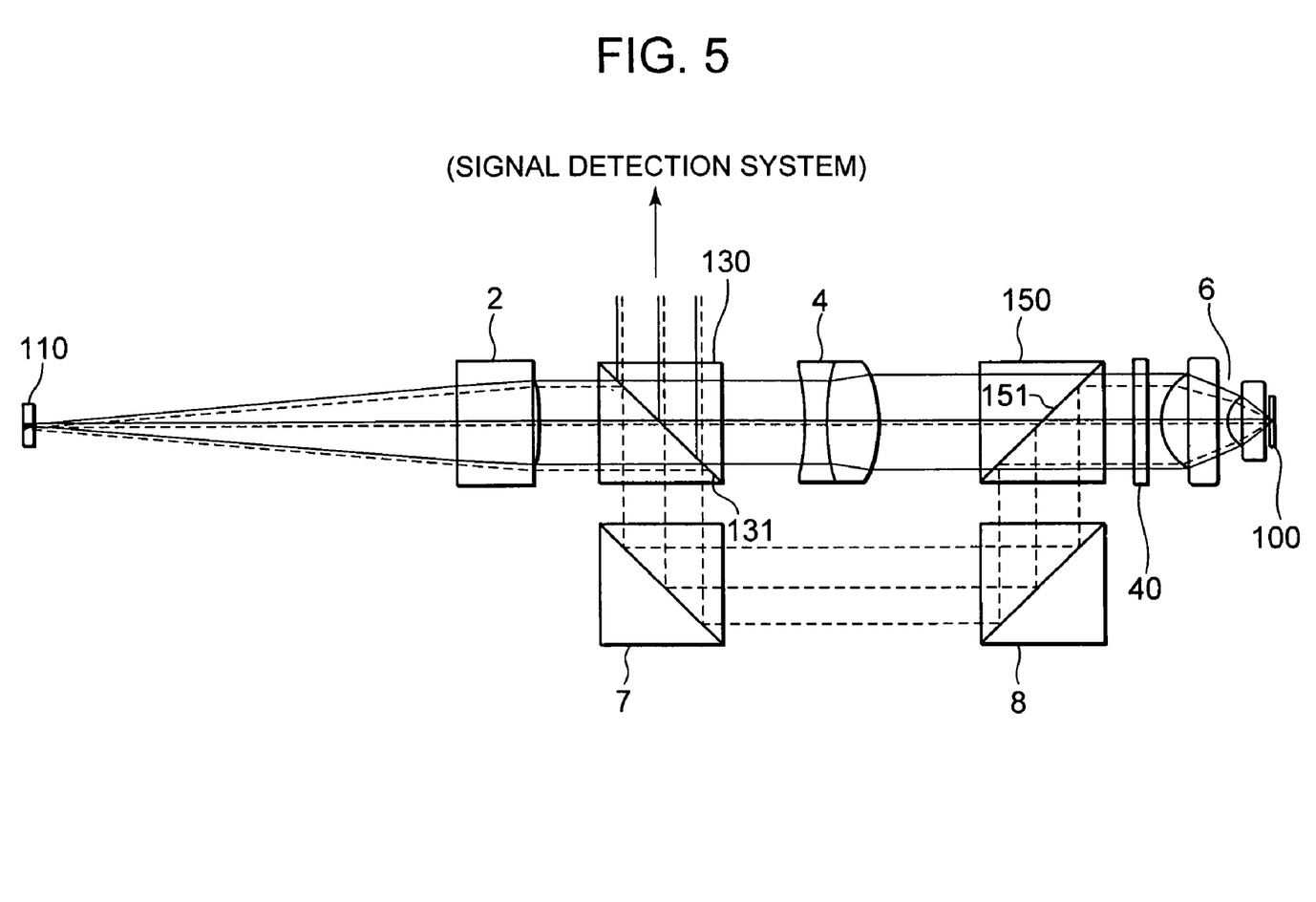
FIG. 5 is a block diagram showing the structure of an optical system housed in an optical pickup according to a third embodiment of the present invention.

FIG. 5 is a block diagram showing the structure of an optical system housed in an optical pickup according to a third embodiment of the present invention. In FIG. 5, the same reference numerals are used to denote the same sections as those used in the first embodiment, and the description of the same sections is omitted. The optical system of the optical pickup includes a three-wavelength laser diode (LD) 110, a three-wavelength collimator lens 2, a polarizing beam splitter 130, the magnification conversion element 4, a beam splitter 150, the three-wavelength objective lens 6, the mirrors 7 and 8, and a quarter wave plate 40. The mirrors 7 and 8 form a bypass optical path which allows laser light to bypass the magnification conversion element 4.

Figure 7:
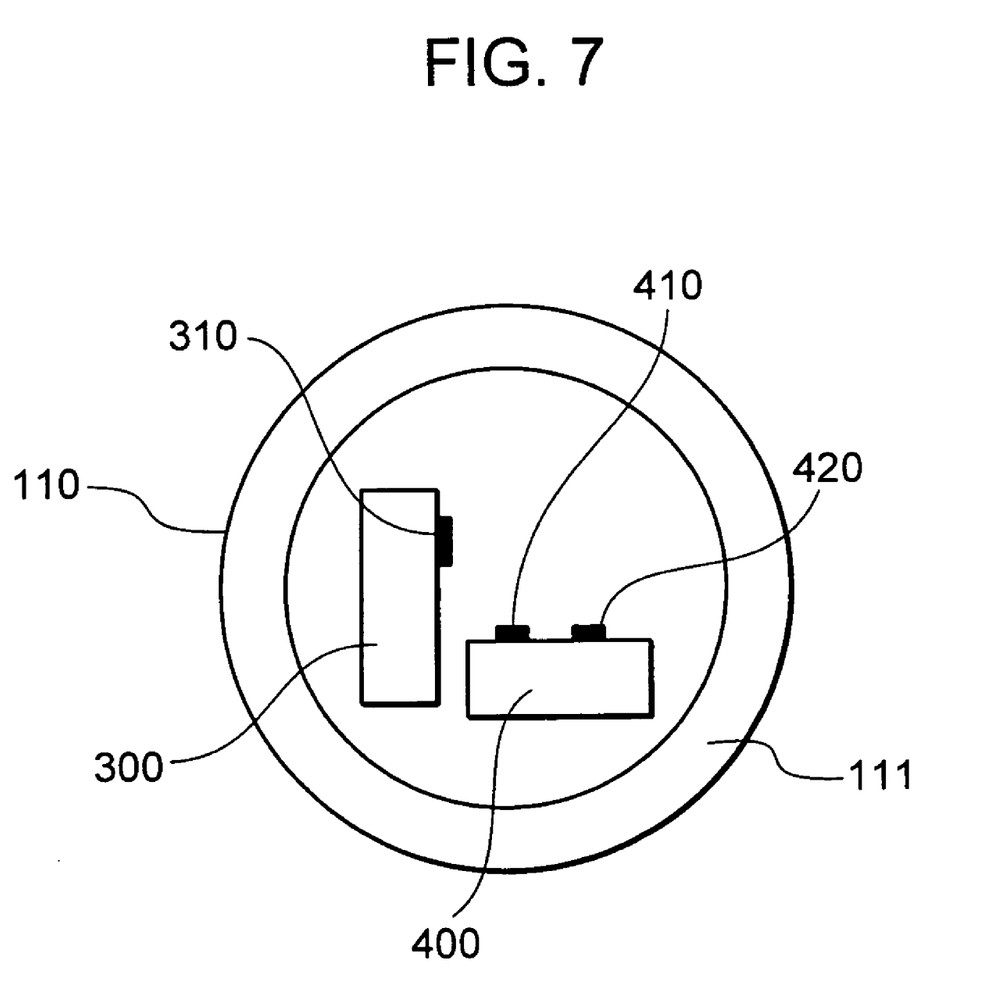
FIG. 7 is a view showing an example of the structure of a laser diode used in each of the optical pickups according to third and fourth embodiments of the present invention.

The three-wavelength laser diode (LD) 110 has a structure in which a laser chip 300 and a laser chip 400 are arranged in one package 111 in such a manner as to be positioned at 90 degrees to each other as shown in FIG. 7. The laser chip 300 has an emission point 310 which emits a laser light of wavelength 407 nm, while the laser chip 400 has emission points 410 and 420 which emit a laser light of wavelength 650 nm and a laser light of wavelength 780 nm, respectively. In this structure, a laser light of wavelength 407 nm for BD is emitted as a laser light having a predetermined polarization direction, while a laser light of wavelength 650 nm for DVD and a laser light of wavelength 780 nm are each emitted as a laser light having a polarization direction perpendicular to the predetermined polarization direction.

The polarizing beam splitter 130 is a polarizing element in which a film 131 is set so as to allow the laser light having the predetermined polarization direction to pass through and so as to reflect the laser light beams each having the polarization direction perpendicular to the predetermined polarization direction. The polarizing beam splitter 130, in combination with the quarter wave plate 40, is set so as to transmit a laser light emitted from the three-wavelength laser diode (LD) 110 and having the predetermined polarization direction, and reflect the laser light when the laser light is reflected from the optical disc 100 and again enters the polarizing beam splitter 130. In addition, if a laser light which enters the polarizing beam splitter 130 from the three-wavelength laser diode (LD) 110 is perpendicular to the predetermined polarization direction, the polarizing beam splitter 130 reflects the laser light, and when the laser light is reflected from the optical disc 100 and again enters the polarizing beam splitter 130, the polarizing beam splitter 130 transmits the laser light.

The beam splitter 150 includes a film 151 which is designed to selectively perform transmission and reflection of incident laser light according to the wavelength thereof, similarly to the second beam splitter 5 used in the first embodiment.

The operation of the second embodiment will be described below. If the optical disc 100 is a BD, a laser light of wavelength 407 nm for BD is emitted from the three-wavelength laser diode 110. The laser light is converted into an approximately parallel light beam by the collimator lens 2, and the approximately parallel light beam passes through the polarizing beam splitter 130 and enters the magnification conversion element 4. The laser light whose beam diameter is magnified by the magnification conversion element 4 passes through the beam splitter 150 and the quarter wave plate 40 and enters the three-wavelength objective lens 6, and is focused onto the optical disc 100 by the three-wavelength objective lens 6. At this time, light reflected from the optical disc 100 enters the three-wavelength objective lens 6 and is converted into an approximately parallel light beam, and the approximately parallel light beam passes through the quarter wave plate 40 and the beam splitter 150. After the beam diameter of the light beam is reduced by the magnification conversion element 4, the light beam enters the polarizing beam splitter 130. Since the polarization direction of the light beam which enters the polarizing beam splitter 130 at this time is changed to a direction perpendicular to the predetermined polarization direction, the light beam is changed by 90 degrees in optical path by being reflected by the film 131 of the polarizing beam splitter 130, and enters a signal detection system (not shown).

In this case, since the magnification conversion element 4 is provided in the optical path, the following formula is obtained:

$$\beta = K \cdot f2/f1 \quad (2)$$

where f2 denotes the focal length of the collimator lens 2, f1 denotes the focal length of the three-wavelength objective lens 6, β denotes optical magnification, and K denotes the magnification of the magnification conversion element 4.

In this case, if the magnification K of the magnification conversion element 4 is larger than 1, the beam diameter of the laser light which enters the magnification conversion element 4 in the above-mentioned manner is increased to change a composite focal length defined by the magnification conversion element 4 and the three-wavelength objective lens 6, thereby reducing the composite focal length. Accordingly, from formula (2), the optical magnification β is increased by the action of the magnification conversion element 4, whereby the optical magnification β can be increased twelve fold, for example.

If the optical disc 100 is a DVD, a laser light of wavelength 650 nm for DVD is emitted from the three-wavelength laser diode 110. The laser light is a laser light having a polarization direction perpendicular to the laser light for BD, and is converted into an approximately parallel light beam by the collimator lens 2. The approximately parallel light beam is changed by 90 degrees in optical path by being reflected by the film 131 of the polarizing beam splitter 130, and enters the mirror 7. The light beam is changed by 90 degrees in optical path by the mirror 7 and enters the mirror 8, and is further changed by 90 degrees in optical path by the mirror 8 and enters the second beam splitter 150. The laser light which enters the beam splitter 150 is changed by 90 degrees in optical path by the film 151 of the beam splitter 150 and passes through the quarter wave plate 40 and enters the three-wavelength objective lens 6. The laser light is focused onto the optical disc 100 by the three-wavelength objective lens 6. Light reflected from the optical disc 100 at this time enters the three-wavelength objective lens 6 and is converted into an approximately parallel light beam, and the approximately parallel light beam passes through the quarter wave plate 40 and enters the beam splitter 150. The light beam is changed by 90 degrees in optical path by the film 151 and enters the mirror 8, and is changed by 90 degrees in optical path by the mirror 8 and enters the mirror 7. The light beam is further changed by 90 degrees in optical path by the mirror 7 and enters the polarizing beam splitter 130. Since the polarization direction of the light beam which enters the polarizing beam splitter 130 at this time is changed to the predetermined polarization direction, the light beam passes through the polarizing beam splitter 130 and enters the signal detection system (not shown).

Namely, if a laser light of wavelength 650 nm is emitted from the three-wavelength laser diode 110, the laser light (including light reflected from the optical disc 100) is made pass through the bypass optical path formed by the polarizing beam splitter 130, the mirrors 7 and 8, and the beam splitter 150 without passing through the magnification conversion element 4, so that the optical magnification β becomes:

$$\beta = f2/f1 \quad (3)$$

Accordingly, if K>1, the optical magnification β becomes smaller than that expressed by formula (2) relating to the case where a laser light passes through the magnification conversion element 4, and can be made fivefold, for example.

In this structure, as the magnification conversion element 4, it is possible to use, instead of a one-group/two-element expander lens as shown in FIG. 5, a two-group/two-element expander lens as shown in FIG. 2, a two-group/three-element expander lens as shown in FIG. 3, or the like.

Although not shown, the film 131 of the polarizing beam splitter 130 and the film 151 of the beam splitter 150 may also be designed so that when a laser light of wavelength 780 nm for CD is emitted from the three-wavelength laser diode 110, the laser light (including light reflected from the optical disc 100) passes through the bypass optical path formed by the polarizing beam splitter 130, the mirrors 7 and 8, and the beam splitter 150. In this case, the optical magnification β is, for example, fivefold as expressed by formula (3), but optimum optical magnification for the recording and reproduction of CDs is approximately fourfold which is not very different from fivefold, so that degradation can be almost completely prevented from occurring in recording and reproduction characteristics.

According to the third embodiment, in the optical paths each having the three-wavelength collimator lens 2 and the three-wavelength objective lens 6 which are shared by laser light beams of three wavelengths for BD, DVD and CD, a laser light is made pass through either the optical path passing through the magnification conversion element 4 or the bypass optical path bypassing the magnification conversion element 4, according to the wavelength of the laser light, whereby the optical magnification can be freely changed to optimum values for the types of discs to be recorded or reproduced. Accordingly, recording and reproduction can be performed with high quality irrespective of the type of disc.

In addition, if a one-group/two-element expander lens and a two-group/three-element expander lens are used as the magnification conversion element 4, it is also possible to obtain the advantage of correcting the optical system for chromatic aberration in the optical path passing through the magnification conversion element 4.

Embodiment 4

Figure 6:
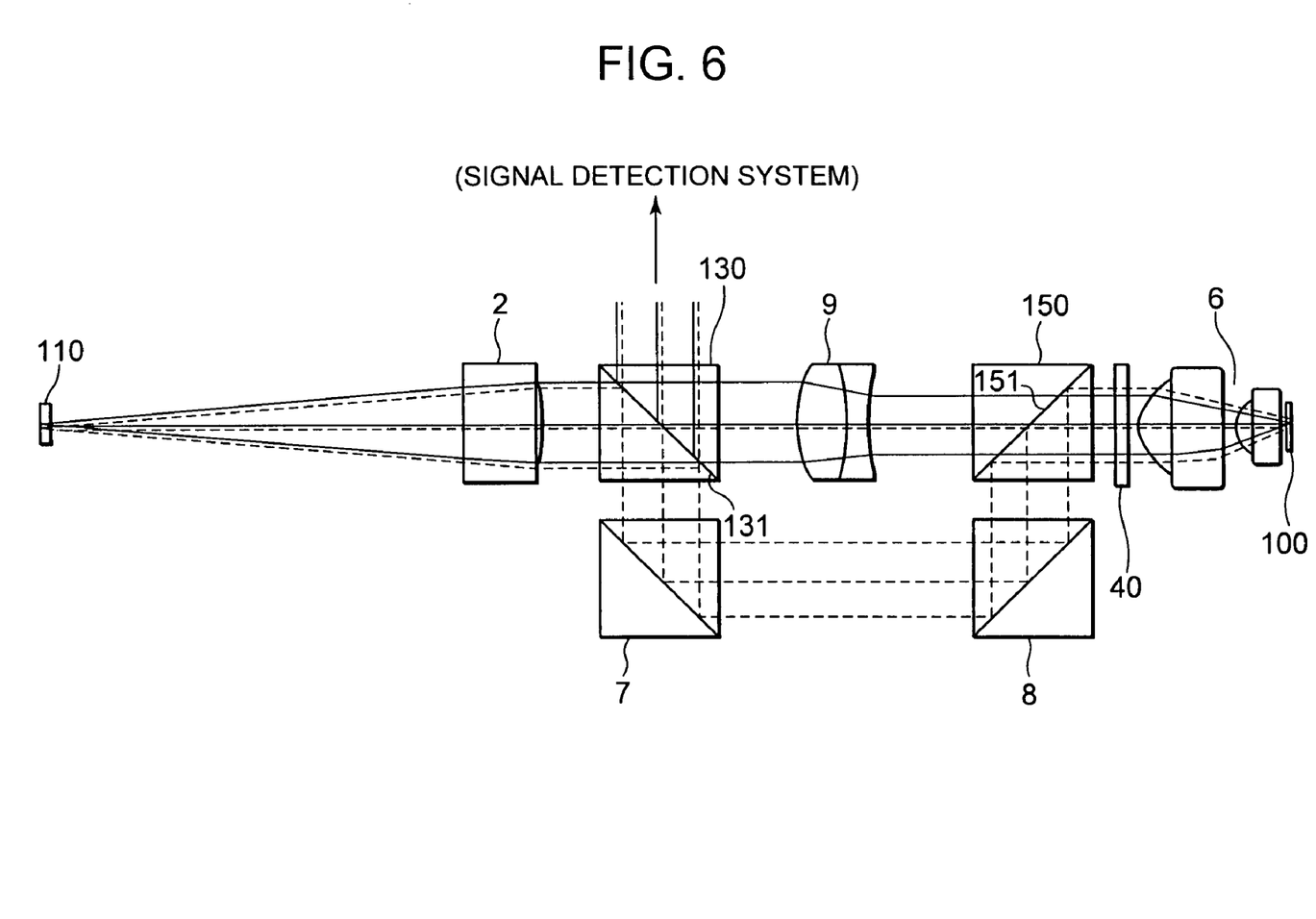
FIG. 6 is a block diagram showing the structure of an optical system housed in an optical pickup according to a fourth embodiment of the present invention.

FIG. 6 is a block diagram showing the structure of an optical system housed in an optical pickup according to a fourth embodiment of the present invention. In FIG. 6, the same reference numerals are used to denote the same sections as those used in the third embodiment, and the description of the same sections is omitted. The optical system of the optical pickup includes the three-wavelength laser diode (LD) 110, the three-wavelength collimator lens 2, the polarizing beam splitter 130, the magnification conversion element 9, the first beam splitter 150, the three-wavelength objective lens 6, the mirrors 7 and 8, and the quarter wave plate 40. The mirrors 7 and 8 form a bypass optical path which allows laser light to bypass the magnification conversion element 9.

The operation of the fourth embodiment will be described below. In the fourth embodiment, a magnification conversion element of K<1 is used as the magnification conversion element 9, and the film 131 of the polarizing beam splitter 130 and the film 151 of the beam splitter 150 are designed so that when a laser light of wavelength 407 nm for BD is emitted, the laser light is made to pass through the bypass optical path formed by the polarizing beam splitter 130, the mirrors 7 and 8, and the beam splitter 150, whereas when a laser light of wavelength 650 nm for DVD is emitted, the laser light is made to pass through an optical path formed by the polarizing beam splitter 130, the magnification conversion element 9 and the beam splitter 150. Otherwise, the polarization direction of the laser light emitted from the three-wavelength laser diode (LD) 110 may be changed.

In the fourth embodiment as well, the optical magnification β of the optical path bypassing the magnification conversion element 9 is expressed by formula (3), and the optical magnification β of the optical path passing through the magnification conversion element 9 is expressed by formula (2). Accordingly, if the optical magnification β of the optical path along which a laser light of wavelength 407 nm bypasses the magnification conversion element 9 is set to, for example, 12, the optical magnification K of the magnification conversion element 9 through which a laser light of wavelength 650 nm passes becomes smaller than 1, so that the optical magnification β becomes smaller than that expressed by formula (2) and can be made 5, for example. In this case as well, when a laser light of wavelength 780 nm for CD is emitted, the optical path passing through the magnification conversion element 9 is used for the same reason as the first embodiment.

According to the fourth embodiment, it is possible to obtain an advantage similar to that of the third embodiment by setting the film 131 of the polarizing beam splitter 130 and the film 151 of the beam splitter 150 so that the bypass optical path which bypasses the magnification conversion element 9 is used during recording and reproduction of BDs, while the optical path which passes through the magnification conversion element 9 is used during recording and reproduction of DVDs.

In addition, the third and fourth embodiments have been described with reference to the three-wavelength laser diode (LD) 110 which emits laser light beams having different polarization directions, but if a polarizing element having wavelength selectivity which is set so as to change the polarization direction of a laser light of a predetermined wavelength is arranged between a three-wavelength laser diode (LD) and a collimator lens, a three-wavelength laser diode (LD) which emits laser light beams having the same polarization direction can also be used.

Embodiment 5

Figure 8:
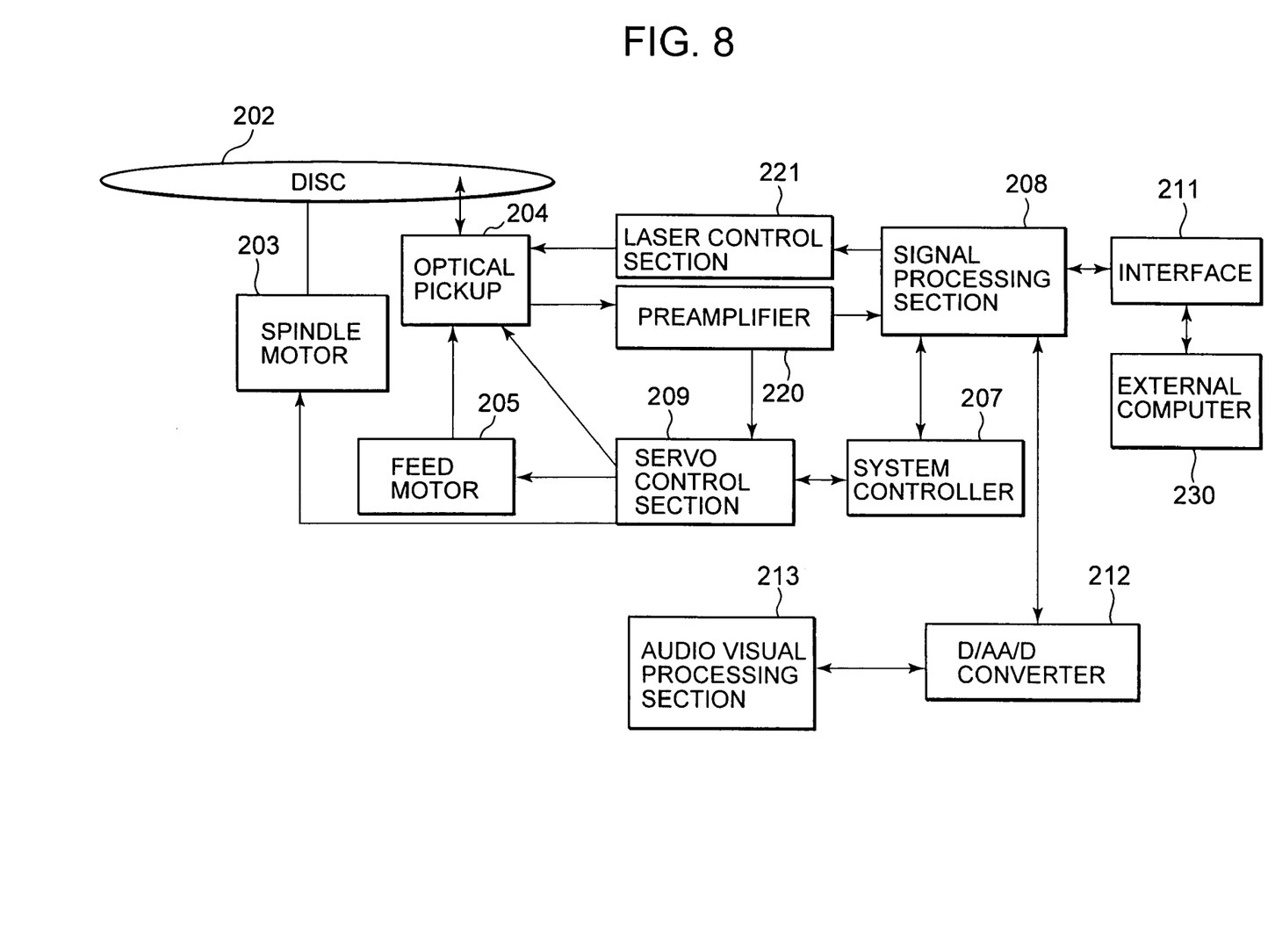
FIG. 8 is a block diagram showing the structure of essential sections of an optical disc apparatus according to the third embodiment of the present invention.

FIG. 8 is a block diagram showing the structure of essential sections of an optical disc apparatus according to a fifth embodiment of the present invention. The optical disc apparatus is constructed to access a disc 202, which is a disc medium such as a DVD±R/RW, a CD±R/RW or a BD, and record and reproduce data on and from the disc 202, by means of an optical pickup 204. The optical disc apparatus includes a spindle motor 203 which serves as drive means for rotationally driving the disc 202, the optical pickup 204 which performs writing and reading of data to and from the disc 202, a feed motor 205 which serves as drive means for moving the optical pickup 204 in the radial direction of the disc 202, a system controller 207 which performs control of the entire apparatus and the like, a signal processing section 208 which performs predetermined processing such as demodulation and error correction on the basis of the output signal from a preamplifier 220, a serve control section 209 which controls the spindle motor 203 and the feed motor 205, the preamplifier 220 which generates a focus error signal, a tracking error signal, an RF signal and the like on the basis various signals outputted from the optical pickup 204, an interface 211 which connects the signal processing section 208 and an external computer 230, a laser control section 221 which drives a laser light source provided in the optical pickup 204, the external computer 230 which receives as a reproduced signal a signal recorded on the disc 202 and which causes the signal processing section 208 to modulate data and output the modulated data to the laser control section 221 and causes the laser control section 221 to drive the laser light source provided in the optical pickup 204, a D/A/A/D converter 212 which performs D/A conversion of a signal outputted from the signal processing section 208 or A/D conversion of a signal outputted from an audio visual processing section 213, and an audio visual processing section 213 which processes an audio video signal to be recorded or a reproduced audio video signal. The optical pickup 204 uses one of the optical systems indicated by the first to the fourth embodiment.

The feed motor 205 for moving the optical pickup 204 to a predetermined recording track on the disc 202, for example, is connected to the optical pickup 204. Control of the spindle motor 203, control of the feed motor 205, and control of the focusing and tracking directions of a two-axis actuator holding an objective lens of the optical pickup 204 are performed by the serve control section 209 on the basis of a focus error signal and a tracking error signal inputted from the preamplifier 220. The laser control section 221 serves to control laser diodes 1 or 110 provided in the optical pickup 204, and performs variable control of the output power of each of the laser diodes 1 or 110 during recording mode and during reproducing mode.

According to the fifth embodiment, the optical disc apparatus is equipped with the optical pickup 204 which houses the optical system used in either of the first, second, third or fourth embodiments respectively shown in FIGS. 1, 4, 5 or 6 so that the optical magnification can be optimized for the recording and reproduction of three types of discs, i.e., BDs, DVDs and CDs and any of the three types of discs can be recorded and reproduced with high quality.

Although the preferred embodiments of the present invention are particularly described herein, the present invention is not limited to the above-mentioned preferred embodiments. It will be obvious to those skilled in the art that various changes, modifications, combinations, sub combinations and alterations may be made depending on design requirements and other factors insofar as they are within the scope of the appended another preferred embodiment of the present inventions or equivalents thereof.

For example, in each of the above-mentioned embodiments, the wavelengths of laser light beams used in the recording and reproduction of BDs, DVDs and CDs are 407 nm, 650 nm and 780 nm, respectively, but in practical terms, laser light beams having different wavelength ranges of 400-415 nm, 630-670 nm and 760-800 nm can be used for the respective types of discs, and numerical apertures NA of the objective lens for the respective types of discs are 0.80-0.90, 0.58-0.68 and 0.43-0.53. In the case of recording and reproduction of HD-DVDs, the wavelength of laser light is 400-415 nm, and the numerical aperture NA of the objective lens is 0.65-0.75. Furthermore, the magnification conversion element may have an n-group/m-element lens structure, where n and m assume arbitrary positive integers.

A preferred embodiment of the present invention contains subject matter related to Japanese Patent Applications JP2004-144837 and JP2005-114380, filed in the Japanese Patent Office on May 14, 2004 and Apr. 12, 2005, respectively, the entire contents of which being incorporated herein by reference.

What is claimed is:

1. An optical pickup housing an optical system including a collimator lens for converting laser light incident on the collimator lens into an approximately parallel light beam, and an objective lens for receiving the laser light converted into the approximately parallel light beam and focusing the laser light onto a recording medium, the optical pickup comprising:
 a light source configured to emit a plurality of laser light beams of different wavelengths;
 a magnification conversion element arranged between the collimator lens and the objective lens;
 a bypass optical path configured to bypass the magnification conversion element; and
 optical path selection unit configured to select, according to a wavelength of each of said the plurality of laser light beams, whether each of the plurality of laser light beams is to pass through an optical path passing through the magnification conversion element or through the bypass optical path.

2. The optical pickup according to claim 1, wherein one of the plurality of laser light beams has a wavelength of 400-415 nm, and, when the recording medium is to be recorded or reproduced with the laser light having the wavelength, if the magnification of the magnification conversion element is larger than 1, the optical path selection unit selects one of the optical paths so that the laser light passes through the magnification conversion element, and, if the magnification of the magnification conversion element is smaller than 1, the optical path selection unit selects the other of the optical paths so that the laser beam passes through the bypass optical path.

3. The optical pickup according to claim 1, wherein one of the plurality of laser light beams has a wavelength of 630-670 nm, and when the recording medium is to be recorded or reproduced with the laser light having the wavelength, if the magnification of the magnification conversion element is larger than 1, the optical path selection unit selects one of the optical paths so that the laser light passes through the bypass optical path, and, if the magnification of the magnification conversion element is smaller than 1, the optical path selection unit selects the other of the optical paths so that the laser light passes through the magnification conversion element.

4. The optical pickup according to claim 1, wherein one of the plurality of laser light beams has a wavelength of 760-800 nm, and when the recording medium is to be recorded or reproduced with the one laser light having the wavelength, if the magnification of the magnification conversion element is larger than 1, the optical path selection unit selects one of the optical paths so that the laser light passes through the bypass optical path, and, if the magnification of the magnification conversion element is smaller than 1, the optical path selection unit selects the other of the optical paths so that the laser light passes through the magnification conversion element.

5. The optical pickup according to claim 1, wherein the optical path selection unit includes two beam splitters provided at an entrance and an exit of the bypass optical path.

6. The optical pickup according to claim 1, wherein the magnification conversion element comprises one of a one-group/two-element expander lens, a two-group/two-element expander lens and a two-group/three-element expander lens.

7. The optical pickup according to claim 1, wherein the plurality of laser light beams is emitted from a two-wavelength laser diode or a three-wavelength laser diode.

8. The optical pickup according to claim 1, wherein the optical path selection unit further comprises a beam splitter having wavelength selectivity, wherein an optical path is selected by performing transmission or reflection according to the wavelength of a laser beam incident on the optical path selection unit.

9. The optical pickup according to claim 1, wherein the optical path selection unit comprises a polarizing beam splitter, wherein an optical path is selected by performing transmission or reflection according to the polarization direction of a laser beam incident on the optical path selection unit.

10. An optical disc apparatus configured to focus laser light onto an optical disc by an optical pickup and to receive light reflected from the optical disc by the optical pickup so as to perform data recording/reproduction, wherein
the optical pickup comprises:
a light source for emitting a plurality of laser light beams of different wavelengths;
a collimator lens configured to convert a laser beam incident from the light source into an approximately parallel light beam;
an objective lens configured to focus the laser light converted into the approximately parallel light beam onto a recording medium;
a magnification conversion element arranged between the collimator lens and the objective lens;
a bypass optical path configured to bypass the magnification conversion element; and
an optical path selection unit for selecting, according to the wavelength of each of the plurality of laser light beams, whether each of the plurality of laser light beams is to pass through an optical path passing through the magnification conversion element or through the bypass optical path.

11. The optical disc apparatus according to claim 10, wherein the plurality of laser light beams emitted from the light source have wavelengths of 400-415 nm, 630-670 nm and 760-800 nm, respectively.

12. The optical disc apparatus according to claim 10, wherein the optical path selection unit comprises a beam splitter having wavelength selectivity, wherein an optical path is selected by performing transmission or reflection according to the wavelength of a laser beam incident on the optical path selection unit.

13. The optical disc apparatus according to claim 10, wherein the optical path selection unit comprises a polarizing beam splitter, wherein an optical path is selected by performing transmission or reflection according to the polarization direction of a laser beam incident on the optical path selection unit.

* * * * *